(12) United States Patent
Bresnahan

(10) Patent No.: US 6,584,748 B2
(45) Date of Patent: Jul. 1, 2003

(54) DECK COVERING SYSTEM

(76) Inventor: Mary Bresnahan, 518 NW. 77th St., Boca Raton, FL (US) 33487

( * ) Notice: Subject to any disclaimer, the term of this patent is extended or adjusted under 35 U.S.C. 154(b) by 0 days.

(21) Appl. No.: 09/792,829

(22) Filed: Feb. 23, 2001

(65) Prior Publication Data
US 2001/0045073 A1 Nov. 29, 2001

Related U.S. Application Data
(60) Provisional application No. 60/184,877, filed on Feb. 25, 2000.

(51) Int. Cl.[7] .............................................. E04H 12/00
(52) U.S. Cl. ........................ 52/650.3; 52/588; 52/537; 403/363; 403/381
(58) Field of Search ............................... 52/650.3, 588, 52/592.1, 592.2, 522, 537; 403/331, 363, 381

(56) References Cited

U.S. PATENT DOCUMENTS

| | | | | |
|---|---|---|---|---|
| 3,813,839 A | * | 6/1974 | Simpson, Jr. ................. | 52/588 |
| 4,048,960 A | * | 9/1977 | Barnidge et al. ............. | 52/588 |
| 4,951,992 A | * | 8/1990 | Hockney ...................... | 52/588 |
| 5,048,448 A | * | 9/1991 | Yoder ........................... | 52/588 |
| 5,351,458 A | * | 10/1994 | Lehe ............................. | 52/588 |
| 6,301,842 B1 | * | 10/2001 | Chaney et al. ............. | 52/650.3 |
| 6,324,796 B1 | * | 12/2001 | Heath ........................ | 52/592.1 |
| 6,423,257 B1 | * | 7/2002 | Stobart et al. ............. | 52/592.1 |

* cited by examiner

Primary Examiner—Carl D. Friedman
Assistant Examiner—Nahid Amiri
(74) Attorney, Agent, or Firm—Robert M. Downey PA

(57) ABSTRACT

Interlocking cover members made of a rigid polyvinyl chloride (PVC) material and formed by an extrusion process are each defined by a main panel having a top side with a top surface, a bottom side, and opposite first and second longitudinal edge zones. Longitudinal rib members extend downwardly from the bottom side of the panel in spaced, parallel relation to one another to strengthen and stabilize the panel in supported, spaced relation above an underlying surface being covered. An attachment lip extends outboard of the second longitudinal edge zone, below a level of the panel, and includes a lock channel for interlocking receipt of a barbed rail extending from the bottom side of an adjacently positioned cover member. The attachment lip is structured to rest on the surface being covered and accommodates screw fasteners, at spaced intervals, for securing the cover member to the underlying surface. The first longitudinal edge zone of the adjacently positioned cover member extends over the attachment lip to conceal the screw fasteners, thereby providing a finished aesthetically appealing appearance to the deck surface.

14 Claims, 1 Drawing Sheet

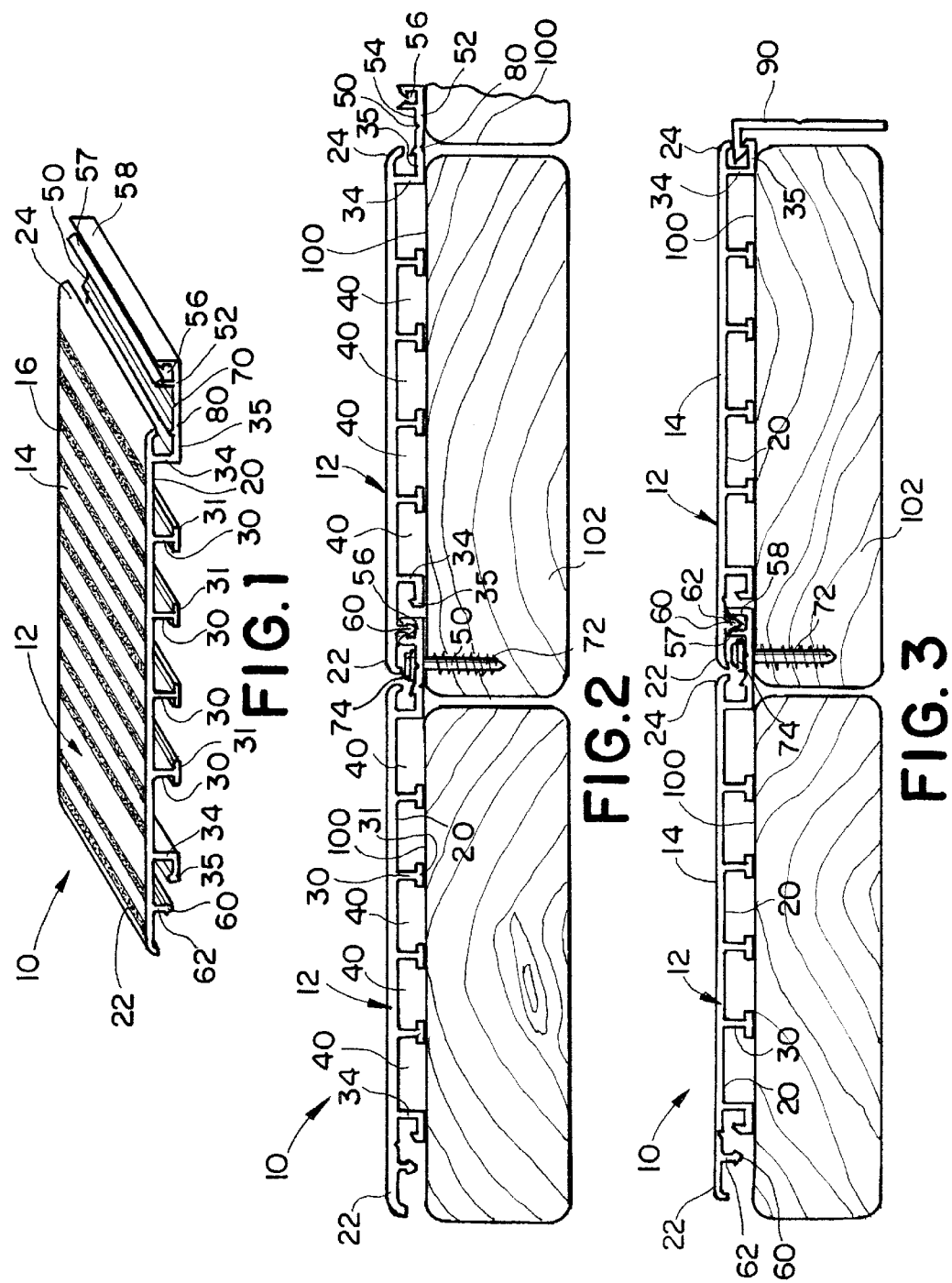

DECK COVERING SYSTEM

This application claims benefit of Provisional application Ser. No. 60/184,877 filed Feb. 25, 2000.

BACKGROUND OF THE INVENTION

1. Field of the Invention

The present invention relates to covers for wood and cement decks and, more particularly, to deck covering systems which use elongate panel members formed of an extruded plastic material, wherein the cover members are secured to the top surface of an underlying wood or cement deck with the use of screw fasteners, adhesive or other attachment means.

2. Discussion of the Related Art

Outdoor decks, including patios, pool decks, docks, and boardwalks are typically constructed of wood or concrete. Over time, the exposure to outdoor elements causes the top surface of wood, cement and concrete decks to become unattractive. In particular, exposure to moisture from rain, sprinklers, and sea water causes outdoor decks to grow mold and mildew on the surface as the deck slowly deteriorates. Further, the exposure to the sun's ultraviolet rays contributes to the process of deterioration.

In order to extend the life of outdoor decks and to improve their appearance, various chemical products may be used to remove mildew and brighten the surface. However, these chemical products often contain bleach and other harsh agents which contribute the deterioration of both wood and concrete. Other products for sealing deck surfaces, including clear liquid sealants and paints, provide temporary relief to the inevitable process of deterioration. After two to three years, most paints and sealants begin to crack and flake which further adds to the unpleasant appearance of the weathered deck.

The use of deck covering materials formed of plastic, such as polyvinyl chloride, provides a more permanent solution to the problem of deterioration of wood and concrete outdoor surfaces. Presently, there are a number of products available on the market which provide panels formed of plastic materials that are secured to outdoor decks in order to provide a low maintenance, aesthetically pleasing surface. Deck covers formed of plastic materials are further advantageous in that they may be provided with textured surfaces to prevent slip and fall accidents when the deck is wet. This is particularly useful for steps, docks and decks surrounding swimming pools.

While the various plastic material deck cover panels available in the field are generally suited for their intended purpose, they are somewhat time-consuming to install, as they require installation of a number of components. Typically, plastic or vinyl deck cover systems available in the art use an elongate panel which covers a wood board of a deck. Each panel requires installation of separate strips to cover installation hardware, such as fastening screws. This multi-component system not only adds to the time required for installation, but increases the manufacturing costs per square foot, as separate molds are needed for each component.

The present invention provides a more economical, easy to install deck covering system comprising single component, one piece interlocking cover members made of a rigid polyvinyl chloride (PVC) material. The one piece interlocking cover members are structured to be adjacently positioned, in interlocking engagement, in a manner which covers fastening hardware, thereby eliminating the need for additional components, such as hardware concealing caps and strips. This reduces the cost of manufacturing and installation, while achieving a more uniform appearance once installed.

SUMMARY OF THE INVENTION

The present invention provides a deck covering system comprising one piece interlocking cover members made of a rigid polyvinyl chloride (PVC) material, wherein the cover members are formed by an extrusion process. Each cover member includes an elongate panel having a top side with a top surface, a bottom side, and opposite first and second longitudinal edge zones. The bottom side of the panel is provided with longitudinal rib members which extend downwardly from the bottom side in spaced, parallel relation to one another. The longitudinal rib members are structured to engage an underlying surface being covered by the interlocking cover members in a manner which strengthens and stabilizes the panel in supported, spaced relation above the underlying surface. An attachment lip extends outboard of the second longitudinal edge zone, below a level of the panel, and includes a lock channel for interlocking receipt of a barbed rail on the bottom side of an adjacently positioned cover member. This permits interlocking attachment of adjacently positioned cover members. The attachment lip rests on the underlying surface and accommodates screw fasteners, at spaced intervals, for securing the cover member to the underlying surface. The first longitudinal edge zone on one cover member is structured to cover and conceal the attachment lip and screw fasteners of an adjacently positioned cover member when the two adjacently positioned cover members are interlocked with one another.

BRIEF DESCRIPTION OF THE DRAWINGS

For a fuller understanding of the nature of the present invention, reference should be made to the following detailed description taken in conjunction with the accompanying drawings in which:

FIG. 1 is a front, side perspective view of an interlocking cover member of the deck covering system;

FIG. 2 is an end elevational view, in partial section, showing two adjacently positioned cover members disposed in interlocked engagement and installed on a wood deck surface; and FIG. 3 is an end elevational view, in partial section, showing two adjacently positioned cover members in interlocked engagement when installed on a deck surface and wherein one of the cover members positioned along an edge of the deck is fitted with an end cap for covering the side edge of the wood deck.

Like reference numerals refer to like parts throughout the several views of the drawings.

DETAILED DESCRIPTION OF THE PREFERRED EMBODIMENT

Referring initially to FIG. 1, a cover member of the system of the present invention is shown and generally indicated as 10. The cover member 10 includes a main panel 12 having a top side 14 and a bottom side 20. The top surface of the top side 14 may be provided with traction means 16 to prevent slipping when walking on the top surface. In a preferred embodiment, the traction means 16 is in the form of a textured surface which is applied by an engraving process during manufacture of the cover member. The cover member 10, in a preferred embodiment, is made from a rigid polyvinyl chloride (PVC) material which is formed through an extrusion process to create the profile seen in FIGS. 2 and 3. Once extruded, texture may be applied to the top surface 14 by a surface engraving or embossing process. Alternatively, a fine granular material may be applied to the top surface 14 with the use of adhesives.

A plurality of longitudinal rib members 30, 34 are provided on the bottom side 20 of the panel. Specifically, the ribs 30, 34 extend downwardly from the bottom side 20, in spaced, parallel relation to one another, extending along the entire length of the panel 12. The ribs 30, 34 are structured and disposed to support the panel 12 in spaced relation above an underlying deck surface 100 being covered by the deck covering system of the invention (see FIGS. 2 and 3). Specifically, the longitudinal ribs 30 are provided with flanged feet members 31 which rest on the top surface 100. Likewise, the outboard ribs 34 are provided with feet 35 which extend outwardly from the rib 34 to thereby engage and rest on the underlying deck surface 100. The ribs 30, 34 provide rigidity to the panel 20 so that when weight is applied to the top surface 14, such as when walking on the installed deck system, the panels 12 do not flex or sag downwardly towards the underlying deck surface 100. The ribs 30, 34 further maintain the panel 12 above the underlying deck surface so as to maintain an air gap between the bottom side 20 of the panels and the underlying deck surface 100, thereby defining ventilation channels 40 between the ribs.

The panel 12 is further provided with opposite edge portions. Specifically, the panel 12 includes first and second longitudinal edge zones 22, 24, respectively. The opposite first and second longitudinal edge zones 22, 24 may be curved slightly downward to provide a more aesthetically appealing appearance to the panels 12 when installed in adjacent position, as seen in FIGS. 2 and 3.

An attachment lip 50 is integrally formed with and extends from the foot member 35 of longitudinal rib 34 outboard of the second longitudinal edge zone 24. The attachment lip 50 includes a bottom side 52 which is specifically structured and disposed to lie flat on the underlying deck surface 100. An upward facing side 54 of the attachment lip 50 is provided with a lock channel 56 defined by opposing walls 57, 58. The top, inwardly facing portions of the walls 57, 58 are sloped and notched for snap fit, interlocking engagement with a barbed end 60 of a downwardly extending rail member 62 formed on the bottom side 20 of the panels 12, adjacent the first longitudinal edge zone 22. Accordingly, when two panels are positioned in adjacent relation, as seen in FIGS. 2 and 3, the barbed rail 62 on the bottom side of one panel snaps into the lock channel 56 of the attachment lip 50 of the adjacently positioned panel so that the barbed end 60 is captivated between the walls 57, 58, as seen in FIGS. 2 and 3. When adjacently positioned panels are attached in this manner, the first longitudinal edge zone 22 of one panel is positioned in close parallel relation to the second longitudinal edge zone 24 of the other panel with a small gap of preferably less than 0.5 cm between the adjacent edges. This serves to interlock adjacently positioned panels to provide a uniform spacing and attachment of the panels in covering relation to the underlying deck surface 30.

The attachment lip 50 is further provided with a longitudinal groove 70 for aligned placement of threaded screw fasteners 72 therethrough and into the underlying deck substrate 102. As seen in FIGS. 2 and 3, the screw fasteners 72 extend down into the substrate 102 with the head 74 of the screw fasteners disposed in pressed engagement with the upwardly facing side 54 of the attachment lip 50. Further, it is seen that the first longitudinal edge zone 22 of the adjacently positioned panel 12 is disposed in covering relation to the screw fastener head 74 and attachment lip 50, to thereby conceal the screw fastener head 74.

In a preferred embodiment, a perforation 80 may be provided at the juncture between the attachment lip 50 and the foot member 35, along the second longitudinal edge zone 24 to facilitate separation of the attachment lip 50 from the foot member 35, as seen in FIG. 3. Specifically, separation of the attachment lip 50 may be achieved by bending the attachment lip 50 relative to a remainder of the cover member 12, along the perforation 80. Removal of the attachment lip 50 is particularly useful along side edges of a deck, wherein it is undesirable to have structure hanging over the edge of the deck. Further, once the attachment lip 50 is removed, a side cap panel 90 may be attached perpendicular to the panel 12, between the foot member 35 and the second longitudinal edge zone 24, as seen in FIG. 3.

While the instant invention has been shown and described in accordance with a practical and preferred embodiment thereof, it is recognized that departures from the instant disclosure are contemplated within the spirit and scope of the invention as set forth in the following claims and as interpreted under the doctrine of equivalents.

What is claimed is:

1. A system for covering a deck surface comprising:
   a plurality of elongate cover members each comprising:
      a main panel including a top side with a top surface, a bottom side, and opposite first and second longitudinal edge zones;
      a plurality of longitudinal rib members extending downwardly from said bottom side of said main panel in spaced, parallel relation to one another for reinforcing and stiffening said main panel, and said plurality of longitudinal rib members each having a bottom end with means thereon for engaging the deck surface and supporting said main penal in spaced relation above said deck surface;
      an attachment lip integral with the bottom end of one of said plurality of longitudinal rib members and extending outwardly therefrom and outboard of said second longitudinal edge zone, and said attachment lip being structured and disposed for engaging the deck surface;
      a barbed member extending downwardly from said bottom side of said main panel adjacent to said first longitudinal edge zone;
      a lock channel on said attachment lip and positioned and disposed outboard of said second longitudinal edge zone, said lock channel being structured and disposed for interlocking receipt of said barbed member of an adjacently positioned one of said plurality of elongate cover members, and said lock channel defined by opposing longitudinal parallel spaced walls extending upwardly from said attachment lip and said walls including inwardly facing and opposing members having sloped surfaces and notches for snap fit receipt of said barbed member therebetween; and
      perforation means formed in said attachment lip for separating said attachment lip and said lock channel from said one of said plurality of longitudinal rib members and a remainder of said cover member.

2. The system as recited in claim 1 wherein said attachment lip includes means for accommodating screw fasteners, at spaced intervals, for securing said cover member to the deck surface.

3. The system as recited in claim 2 wherein said first longitudinal edge zone is structured and disposed to cover and hide said plurality of screw fasteners secured through said attachment lip when said barbed member is interlocked within said lock channel of adjacently positioned cover members.

4. The system as recited in claim 3 wherein said top surface of said main panel is provided with traction means for increasing traction and discouraging slipping when walking on said top surface.

5. The system as recited in claim 4 wherein each of said plurality of cover members is integrally formed as a one-piece structure by an extrusion molding process.

6. The system as recited in claim 5 wherein said plurality of longitudinal rib members are structured to define vent means for permitting ventilating air flow between said bottom side of said main panel and said deck surface.

7. The system as recited in claim 1 wherein said plurality of rib members are structured and disposed to yield against downward forces applied to said top surface of said main panel to thereby discourage flexing and sagging of said main panel.

8. A system for covering a deck surface comprising:
  a plurality of elongate cover members each including a main panel having a top side with a top surface, a bottom side, and opposite first and second longitudinal edge zones, and a plurality of longitudinal rib members extending downwardly from said bottom side of said main panel in spaced, parallel relation to one another for reinforcing and stiffening said main panel, and said plurality of longitudinal rib members each including a bottom end being structured and disposed for engaging the deck surface so that said longitudinal rib members support said main panel in spaced relation above said deck surface;
  means for positioning said cover members in adjacent, parallel arrangement so that said first longitudinal edge zone of one of said cover members is positioned and maintained in close, adjacent and parallel relation to said second longitudinal edge zone of another adjacently positioned one of said cover members, and said means for positioning said plurality of cover members comprising:
    an attachment lip integral with the bottom end of one of said plurality of longitudinal rib members and extending outwardly therefrom and outboard of said second longitudinal edge zone, and said attachment lip being structured and disposed for engaging the deck surface;
    a barbed member extending downwardly from said bottom side of said main panel adjacent to said first longitudinal edge zone;
    a lock channel on said attachment lip and outboard of said second longitudinal edge zone, said lock channel being structured and disposed for interlocking receipt of said barbed member of said adjacently positioned cover member and said lock channel defined by opposing longitudinal parallel spaced walls extending upwardly from said attachment lip and said walls including inwardly facing and opposing members having sloped surfaces and notches for snap fit receipt of said barbed member therebetween; and
    perforation means on said attachment lip for separating said attachment lip and said lock channel from said one of said plurality of longitudinal rib members and a remainder of said cover member.

9. The system as recited in claim 8, wherein said attachment lip includes means for accommodating screw fasteners, at spaced intervals, for securing said cover member to the deck surface.

10. The system as recited in claim 9, wherein said means for positioning said plurality of cover members is structured and disposed to hide said plurality of screw fasteners secured through said attachment lip.

11. The system as recited in claim 10 wherein said top surface of said main panel is provided with traction means for increasing traction and discouraging slipping when walking on said top surface.

12. The system as recited in claim 11 wherein each of said plurality of cover members is integrally formed as a one-piece structure by an extrusion molding process.

13. The system as recited in claim 12 wherein said plurality of longitudinal rib members are structured to define vent means for permitting ventilating air flow between said bottom side of said main panel and said deck surface.

14. The system as recited in claim 8 wherein said plurality of rib members are structured and disposed to yield against downward forces applied to said top surface of said main panel to thereby discourage flexing and sagging of said main panel.

* * * * *